UNITED STATES PATENT OFFICE.

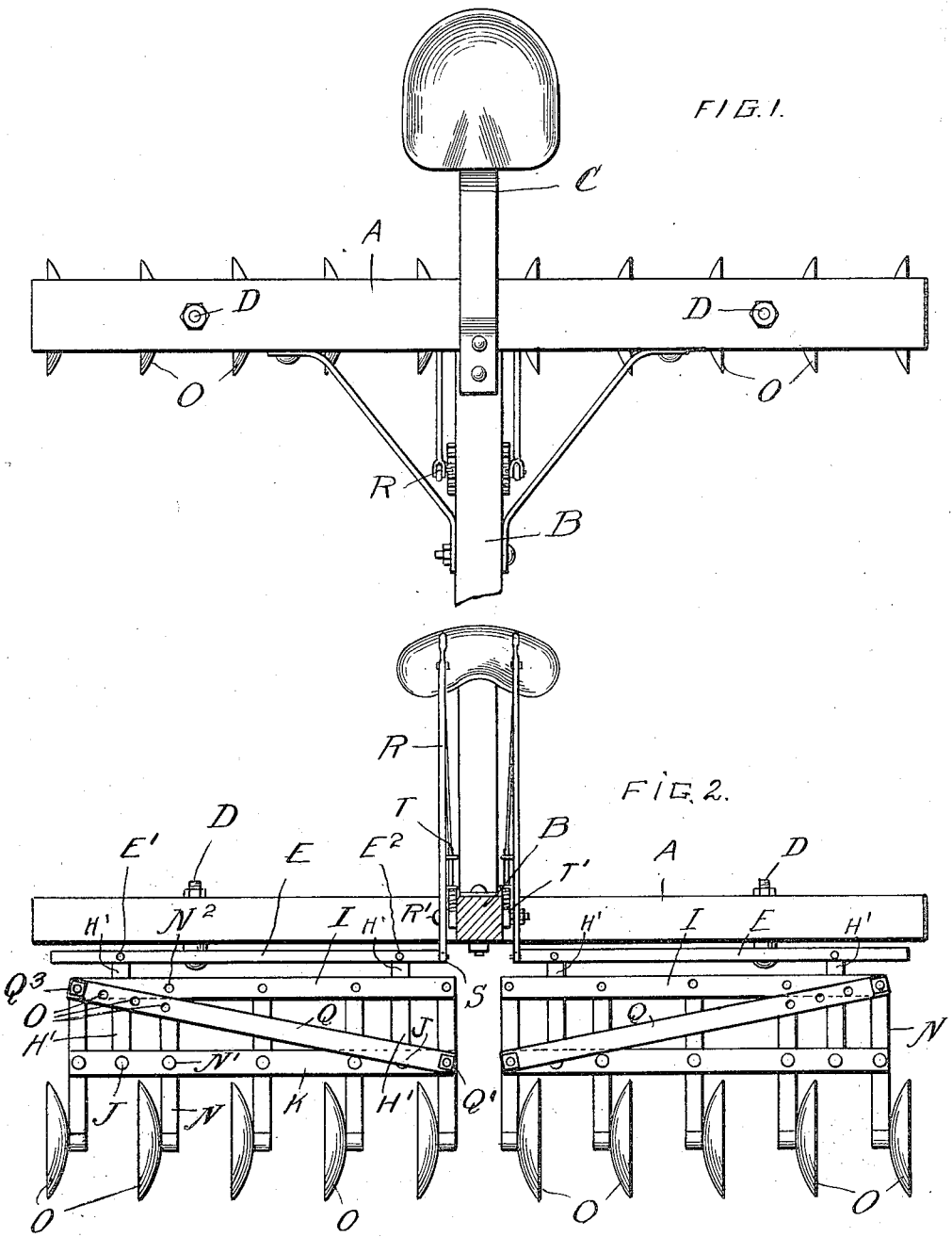

LEWIS A. DRUMMOND, OF PRESTON, MINNESOTA.

DISK CULTIVATOR.

1,075,410.  Specification of Letters Patent.  Patented Oct. 14, 1913.

Application filed April 29, 1913. Serial No. 764,403.

*To all whom it may concern:*

Be it known that I, LEWIS A. DRUMMOND, a citizen of the United States, residing at Preston, in the county of Fillmore and State of Minnesota, have invented certain new and useful Improvements in Disk Cultivators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in an attachment to the frames of ordinary disk harrows and the object in view is to produce a simple and efficient device of this nature so arranged that series of disks may be held at inclinations to one another and having lever mechanism for swinging the series which is mounted upon a frame and pivotally connected to the harrow frame.

The invention comprises various details of construction and combinations and arrangements of parts which will be hereinafter fully described, shown in the accompanying drawings and then specifically defined in the appended claim.

I illustrate my invention in the accompanying drawings, in which:—

Figure 1 is a top plan view of my invention. Fig. 2 is a sectional view through the tongue of the frame to which the invention is applied, parts being shown in elevation.

Reference now being had to the details of the drawings by letter, A designates the frame of an ordinary harrow to which my invention is adapted to be applied and which frame has a tongue B and a seat C. Mounted upon the frame are the bolts D upon which the levers E are pivotally mounted, said levers having pivotal connection at E′ and E² with the bars H′ respectively which are pivotally connected to the bar K by means of pins J. Frames, each made up of two parallel bars I and K, are pivotally connected together by means of the bars N which carry the harrow disks O rotatably mounted at the ends thereof. A diagonally disposed bar Q is pivotally connected at one end Q′ with the innermost of the bars N and its outer end is adjustably fastened by means of a bolt Q³ to the outer bar N and which bolt Q³ may be passed through different apertures O in said bar Q. By this adjustment, the various disks may be held normally in the position shown in Fig. 2 of the drawings or may be held at inclinations accordingly as the bolt Q³ is held in one or another of the perforations Q when the bars I and K will have been moved in different parallel positions relative to each other.

A lever, designated by letter R, is pivotally mounted on the pin R′ upon the tongue and, through the medium of a link S, is connected to the inner end of the lever E, forming means whereby the lever E may be made to swing and with it the frame carrying the harrow disk. A spring-pressed pawl T is carried by the lever and is adapted to engage the segment teeth T′ upon the tongue to hold the frame in different adjusted positions.

By the provision of a harrow device embodying the features of my invention, it will be noted that the same may be easily and quickly applied to the ordinary frame of a disk cultivator and, by the adjustment of the diagonally disposed bar, the disks may be held at different inclinations relative to one another.

In the drawings, I have shown two series of disks, each mounted upon similar bars and each actuated by lever mechanism, one upon either side of the tongue.

What I claim to be new is:—

A disk harrow apparatus comprising, in combination with a harrow frame, a horizontally swinging lever pivotally mounted upon the frame, bars pivoted to said lever, a harrow disk frame comprising two parallel bars with disk carrying knees pivotally connecting the same and to one of which parallel bars said bar which is pivoted to the lever has pivotal connection, a diagonally disposed bar pivoted at its inner end to the inner one of said disk carrying knees and to one of said parallel bars and at its outer end adjustably connected to the outermost of said knees and to the other of said bars, and means for swinging said lever, as set forth.

In testimony whereof I hereunto affix my signature in presence of two witnesses.

LEWIS A. DRUMMOND.

Witnesses:
 H. H. DODGE,
 A. P. NELSON.